Nov. 26, 1968            L. B. ROSEN            3,412,501
EXTENSIBLE FLY SWATTER
Filed Dec. 1, 1966
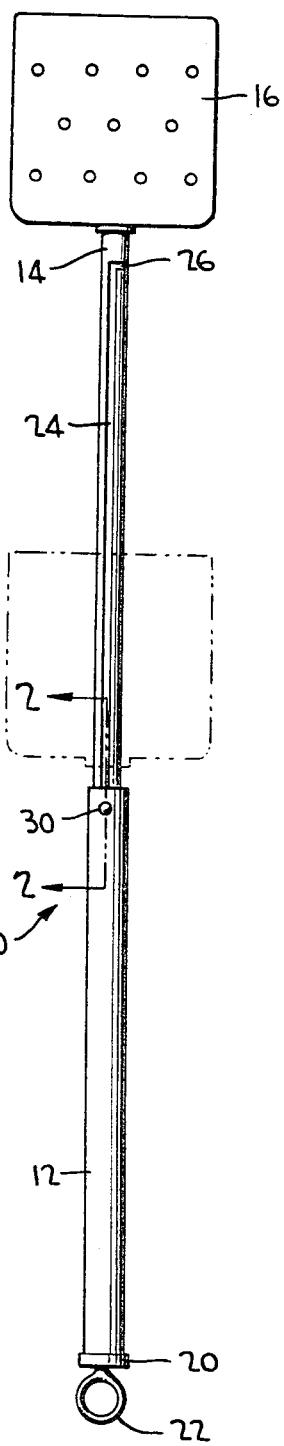
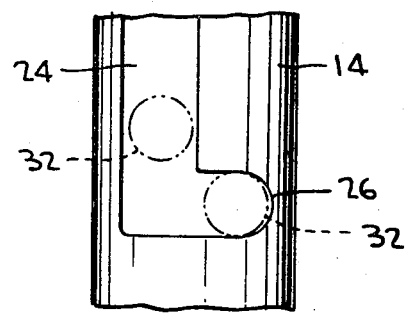
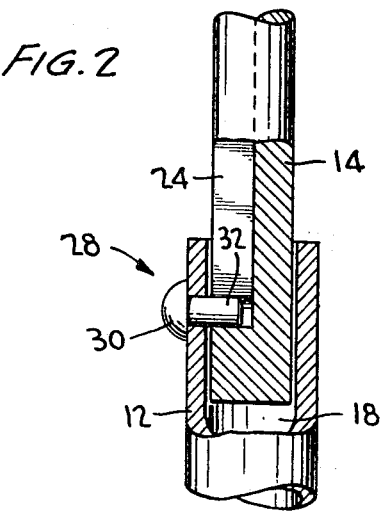
INVENTOR
LEONARD B. ROSEN
BY Jacobi & Davidson
ATTORNEYS

United States Patent Office 3,412,501
Patented Nov. 26, 1968

3,412,501
EXTENSIBLE FLY SWATTER
Leonard B. Rosen, R.D. 2, Jamestown, Pa. 16134
Filed Dec. 1, 1966, Ser. No. 598,330
4 Claims. (Cl. 43—137)

ABSTRACT OF THE DISCLOSURE

An extensible fly swatter having a pair of telescoping handle members, one of which is provided with an elongated groove and the other of which is provided with a guide which fits into the groove. Relative rotation of the handle members permits the fly swatter to be "locked" with the handles in either retracted position or extended position.

---

This invention relates to a fly swatter and in particular it relates to an extensible type of fly swatter having telescoping handle members. As such, the invention is directed to an item which has a utilitarian function and which can also serve as a novelty device.

The conventional fly swatter is formed with a resilient or flexible flap attached to the end of an elongated handle. The length of this handle necessarily determines how close the user must approach the fly or insect before swatting can take place. Sometimes, as the user approaches the fly or insect too closely, such insect will fly away before the user has a chance to swat the same. Also, using the conventional type of fly swatter, it is difficult to swat a fly or insect in a high or awkard location. It thus appears to be desirable and beneficial to provide a fly swatter which can be extended in length so that the user need not approach the fly or insect too closely and so that an insect even in a high place can be swatted with ease. The present invention fulfills such a need.

There have, in the past, been certain proposals to provide fly swatter type devices which can be extended in length, but for the most part such devices proved commercially unsatisfactory. It must be recognized that a fly swatter, by necessity, must be a relatively inexpensive item and must thus have a minimum number of parts so that the same can be easily and inexpensively manufactured. Also, it must be appreciated that suitable means must be provided for readily locking the fly swatter in its extended position and then for quickly and easily releasing the same without the need for any complicated manipulations. Such prior art proposals for extensible fly swatters have failed to meet these manufacturing and operating criteria and as a result have failed to meet with commercial success or public acceptance.

With the foregoing in mind, it is, therefore, an object of the present invention to overcome the difficulties and deficiencies associated with the prior art devices and to provide in their stead a new and improved extensible fly swatter.

Another object of the present invention is to provide an extensible fly swatter which can be inexpensively produced to thus be sold at a very nominal price.

Anther object of the present invention is to provide an extensible fly swatter which can readily be locked in its extended position or unlocked and moved to its retracted position without any undue amount of manual manipulation.

Another object of the present invention is to provide an extensible fly swatter which can be locked in extended position and which will not inadvertently collapse or retract during use.

Other objects, advantages and salient features of the present invention will become apparent from the following detailed description, which, taken in conjunction with the annexed drawings, discloses a preferred embodiment thereof.

Referring to the drawings:

FIGURE 1 is a side elevational view of an extensible fly swatter in accordance with the principles of the present invention;

FIGURE 2 is an enlarged fragmentary sectional view taken along the line 2—2 of FIGURE 1; and FIGURE 3 is a fragmentary elevational view of a portion of one of the handle members, showing the terminal end of the groove means.

The extensible fly swatter in accordance with the principles of the present invention can be generally designated 10 and it includes a first axially elongated tubular handle member 12 and a second axially elongated handle member 14 adapted to be telescoped within the first handle member. A flexible flap 16 of rubber, plastic or other suitable material is secured to the end of the second handle member 14.

The first handle member 12 can be formed of any suitable material and is preferably manufactured as a cylindrical item having a central internal bore 18. The second handle member 14 can likewise be formed of any suitable material and is preferably formed as a solid cylindrical rod. The diameter or cross-sectional dimension of the second handle member 14 is slightly less than the diameter or cross-sectional dimension of the bore 18 so that the second handle member can freely telescope into and out of the first handle member 12. If desired, the end of the first handle member 12 can be provided with an end cap 20 which carries a ring 22 to enable the fly swatter 10 to be hung upon a hook, nail or other similar mounting device.

The second handle member 14 is provided with an axially elongated groove means or channel 24 extending linearly therealong for substantially the full length thereof. At opposite ends of the groove means 24, offset portions 26 are provided. These offset portions 26 are disposed substantially perpendicularly to the extent of the groove means 24 and are formed as blind-ended slots.

A guide means generally designated 28 is secured to the first handle member 12 and extends into the groove means. In the form illustrated, the guide means is a nail or pin having an enlarged head portion 30 abutting against the handle member 12 and an elongated shank 32 extending through the handle member and partially into the internal bore 18. This shank 32 fits within the groove means 24 and, as shown in FIGURE 3, the width of the groove means 24 slightly exceeds the thickness of the shank 32 so that such shank can move or slide freely within the groove means.

The guide means 28 prevents the handle members 12 and 14 from rotating relatively to one another until the shank 32 is aligned with an offset portion 26. Such alignment only occurs when the second handle member 14 has been moved either to its fully extended position as shown in solid lines in FIGURE 1 or to its fully retracted position, as shown in dotted lines in FIGURE 1. In either of these instances, further axial movement of the handle members relative to one another is prevented because the shank 32 contacts the end of the groove means 24. At this time, if the handle members are rotated relatively to one another, the shank 32 will be positioned in an offset portion 26. As will be noted from FIGURE 3, the width of the offset portion 26 is substantially equal to the thickness of the shank 32 so that the shank will become frictionally engaged therewithin and cannot inadvertently slip back into the main groove means 24 until positive rotational force is applied to one of the handle members.

It will thus be appreciated that the fly swatter of the present invention can be locked in either its extended or its retracted position by the simple expedient of rotating the two handle members relatively to one another. Such relative rotation, as aforementioned, frictionally engages the shank 32 within an offset portion 26 to accomplish the desired locking. When it is desired to change positions of the fly swatter, either from retracted position to extended position or vice versa, a reverse rotational movement will unlock the shank from the offset portion and will position the same within the groove means 24. Then, the handle members can be moved axially relatively to one another and a relocking of the shank 32 within the other offset portion 26 can be accomplished. It will thus be appreciated that the fly swatter 10 can be inexpensively produced and can be utilized in a very simple manner, without the need for any undue amount of manual manipulation. Yet, such fly swatter can be positively locked in either extended or retracted position and thus provides a novel and useful item.

After reading the foregoing detailed description, it should be apparent that the objects set forth at the outset of the specification have been successfully achieved by the present invention.

What is claimed is:
1. An extensible fly swatter comprising:
    a first axially elongated tubular handle member;
    a second axially elongated handle member telescopable within said first handle member;
    a flexible flap secured to the end of said second handle member;
    said second handle member including axially elongated groove means formed therewithin; and
    a guide means secured to said first handle member and extending into said groove means, said guide means being an element having a shank portion extending through said first handle member wall and into the interior of such member;
    said second handle member being movable between a retracted position whereat it is substantially disposed interiorly of said first handle member and an extended position whereat it is substantially disposed exteriorly of said first handle member;
    said groove means including offset portions at the opposite ends thereof;
    said first and second handle members being relatively rotatable only at said extended and retracted positions to thereby position said guide means within an offset portion to thus lock said handle members in position.

2. An extensible fly swatter as defined in claim 1 wherein the width of said groove means exceeds the thickness of said shank to enable said shank to move freely within said groove means.

3. An extensible fly swatter as defined in claim 2 wherein the width of said offset portions is substantially equal to the thickness of said shank to thus permit said shank to frictionally engage within said offset portions for locking said handle members in position.

4. An extensible fly swatter as defined in claim 1 wherein said offset portions are disposed substantially perpendicularly to said groove means.

References Cited

UNITED STATES PATENTS

| 301,122 | 7/1884 | Hicks | 401—95 X |
| 866,970 | 9/1907 | Schmitz | 401—83 X |
| 1,055,998 | 3/1913 | Allis et al. | 43—137 |
| 1,214,446 | 1/1917 | Ferguson | 43—137 |
| 1,344,943 | 6/1920 | Graham | 43—135 |
| 1,885,730 | 11/1932 | Krag et al. | 43—137 |
| 1,982,629 | 12/1934 | Bennett | 43—137 |

ALDRICH F. MEDBERY, *Primary Examiner.*